June 28, 1966  F. GASCHE  3,258,151

PRESSURE VESSEL

Filed Nov. 8, 1963

INVENTOR.
Fred Gasche
BY Ralph Hamman
Attorney

3,258,151
PRESSURE VESSEL
Fred Gasche, Erie, Pa., assignor to Autoclave Engineers, Inc., Erie, Pa., a corporation of Pennsylvania
Filed Nov. 8, 1963, Ser. No. 322,302
2 Claims. (Cl. 220—46)

This invention is a pressure vessel having a quick opening closure. The cover is slidably received in the mouth of the vessel and is sealed by an O-ring or similar pressure energized seal engaging the inner side walls. The cover is held in place by a pin extending through mating holes in the side walls of the vessel and cover. The pin is easily removed when the vessel is depressurized.

Figure 1:
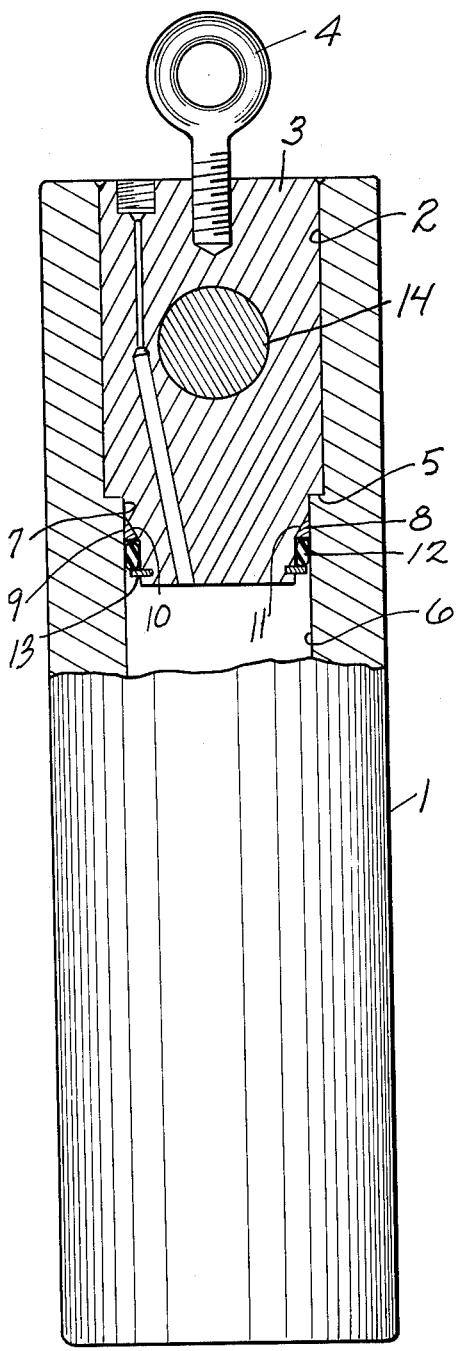
Figure 2:
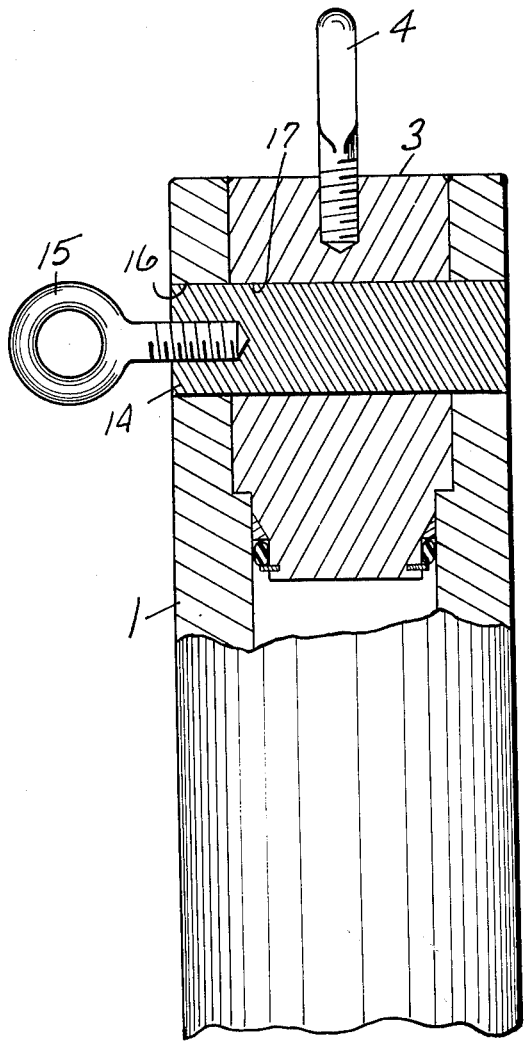

In the drawing, FIG. 1 is a sectional elevation of the pressure vessel and FIG. 2 is a sectional elevation at right angles to FIG. 1.

The pressure vessel 1 has at one end a cylindrical bore 2 slidably receiving a cylindrical cover 3 provided with a handle 4. At the lower end, the bore terminates in a shoulder 5 which serves as a stop positioning the cover. The inner edge of the shoulder merges into a bore 6 slidably receiving the reduced section 7 at the lower end of the cover. The seal between the cover and the pressure vessel is provided by a tapered ring 8 of suitable material such as metal or plastic having a cylindrical surface 9 slidable on the bore 6 and a tapered surface 10 mating with a complementary tapered surface 11 on the cover. An O-ring 12 arranged between the ring 8 and a snap ring 13 is urged against the ring 8 by the internal pressure forcing the ring 8 into tight metal-to-metal engagement between the tapered surface 11 and the bore 6. The snap ring 13 serves as a retainer. The pressure exerted on the O-ring 12 expands it inward and outward to prevent any leakage. The seal is self energizing in that the full pressure of the vessel acts across the sealing elements and furnishes the pressure engagement which is maintained under all operating conditions of temperature and pressure, both transient and steady state.

The outward movement of the cover is prevented by a transverse cylindrical pin 14 having a handle 15. The pin has a sliding fit in aligned diametral bores 16 and 17 in the vessel and cover. When the vessel is depressurized, the cover rests on the shoulder or stop 5 and the bores 16 and 17 are in alignment and slidably receive the pin 14. The pin occupies substantially the full thickness of the walls of the pressure vessel and the entire diameter of the cover. When pressure is applied, the cover moves upward under stress to take up the clearance providing the sliding fit but the small clearances between the pin 14 and the bore 16, 17 prevent any bending of the pin and the stress on the walls of the pressure vessel and on the cover is uniformly distributed throughout the length of the pin without any bending which could cause belling of the open end of the pressure vessel. In this respect, the closure is superior to that provided by screw threaded closures where the axial force applied to the threads exerts a moment tending to bell the open end of the pressure vessel.

What is claimed as new is:

1. A pressure vessel having walls at its outer end provided with a first cylindrical bore terminating in an inwardly extending shoulder, the inner edge of the shoulder merging into a second cylindrical bore, a cylindrical cover slidably received in the first bore and having at its inner end a reduced section slidably received in said second bore, said reduced section at its inner end having an inwardly tapered surface merging into a cylindrical section of reduced diameter, a first ring having a cylindrical outer surface slidably engaging the second bore and a tapered inner surface complementary to the tapered surface on the cover, an O-ring seal below the first ring between the second bore and the section of reduced diameter, said O-ring being urged against said first ring by internal pressure in the vessel to force the first ring into tight engagement between said tapered surface and said second bore and said O-ring being itself expanded inward and outward to provide a seal, diametral bores in the outer end of the cover and the walls of the vessel, said shoulder positioning the cover when the vessel is depressurized with the diametral bores in alignment, and a pin having a sliding fit in the diametral bores and occupying the full diameter of the cover and substantially the full thickness of the walls.

2. A pressure vessel having walls at its outer end provided with a cylindrical bore, a cylindrical cover slidably received in the bore and having at its inner end an inwardly tapered surface merging into a cylindrical section of reduced diameter, a first ring having an outer surface slidably engaging the bore and an inner surface slidably engaging the tapered surface on the cover, an O-ring below the first ring and between the bore and the section of reduced diameter, said O-ring being urged against said first ring by internal pressure in the vessel to force the first ring into tight engagement between said tapered surface and said bore and said O-ring itself being expanded inward and outward to provide a seal, diametral cylindrical bores in the outer end of the cover and the walls of the vessel, stop means positioning the cover when the vessel is depressurized with the diametral bores in alignment, and a cylindrical pin having a sliding fit in the diametral bores and occupying the full diameter of the cover and substantially the full thickness of the walls, the cover moving relative to the walls of the vessel under pressure and the small clearances between the pin and the diametral bores preventing bending of the pin and distributing the stress on the walls of the vessel and on the cover uniformly throughout the length of the pin without any bending which could cause belling of the open end of the pressure vessel.

References Cited by the Examiner
UNITED STATES PATENTS

| | | | |
|---|---|---|---|
| 2,873,878 | 2/1959 | Wolf | 220—46 |
| 3,074,589 | 1/1963 | Chaney | 220—46 |
| 3,123,247 | 3/1964 | Kerr | 220—46 |

FOREIGN PATENTS 709,958  6/1954  Great Britain.

THERON L. CONDON, *Primary Examiner.*
GEORGE E. LOWRANCE, *Examiner.*